US007481430B1

(12) United States Patent
Jackson et al.

(10) Patent No.: US 7,481,430 B1
(45) Date of Patent: Jan. 27, 2009

(54) SLOT MACHINE HAVING MULTIPLE PROGRESSIVE JACKPOTS

(75) Inventors: James P. Jackson, Henderson, NV (US); Robert J. Piechowiak, Las Vegas, NV (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 09/499,592

(22) Filed: Feb. 7, 2000

(51) Int. Cl.
*A63F 1/00* (2006.01)
*G06F 17/00* (2006.01)

(52) U.S. Cl. .................................... 273/138.1; 463/25

(58) Field of Classification Search ............ 463/16–20, 463/12–13, 25–28; 273/138.1, 143 R, 292
See application file for complete search history.

(56) References Cited

U.S. PATENT DOCUMENTS

| | | | | |
|---|---|---|---|---|
| 4,861,041 | A | 8/1989 | Jones et al. | 273/292 |
| 4,948,134 | A * | 8/1990 | Suttle et al. | 273/85 CP |
| 5,048,833 | A | 9/1991 | Lamle | 273/138 |
| 5,249,800 | A | 10/1993 | Hilgendorf et al. | 273/138 |
| 5,263,716 | A | 11/1993 | Smyth | 273/138 |
| 5,275,400 | A * | 1/1994 | Weingardt et al. | 463/12 |
| 5,280,909 | A | 1/1994 | Tracy | 273/138 |
| 5,282,620 | A * | 2/1994 | Keesee | 463/20 |
| 5,286,023 | A * | 2/1994 | Wood | 463/20 |
| 5,344,144 | A * | 9/1994 | Canon | 273/138 A |
| 5,393,061 | A * | 2/1995 | Manship et al. | 463/20 |
| 5,472,194 | A | 12/1995 | Breeding et al. | 273/138 |
| 5,564,700 | A * | 10/1996 | Celona | 463/27 |
| 5,580,053 | A | 12/1996 | Crouch | 463/20 |
| 5,626,341 | A | 5/1997 | Jones et al. | 273/292 |
| 5,788,573 | A | 8/1998 | Baerlocher et al. | 463/16 |
| 5,795,225 | A | 8/1998 | Jones et al. | 463/13 |
| 5,807,172 | A | 9/1998 | Piechowiak | 463/20 |
| 5,851,147 | A | 12/1998 | Stupak et al. | 463/13 |
| 5,855,515 | A | 1/1999 | Pease et al. | 463/27 |
| 5,868,619 | A * | 2/1999 | Wood et al. | 463/13 |
| 5,951,011 | A * | 9/1999 | Potter et al. | 273/292 |
| 6,015,347 | A * | 1/2000 | Maahs et al. | 463/27 |
| 6,017,032 | A * | 1/2000 | Grippo et al. | 273/138.1 |
| 6,117,012 | A * | 9/2000 | McCrea, Jr. | 463/27 |
| 6,155,925 | A * | 12/2000 | Giobbi et al. | 463/20 |
| 6,210,275 | B1 * | 4/2001 | Olsen | 463/16 |
| 6,220,596 | B1 * | 4/2001 | Horan | 273/269 |
| 6,224,484 | B1 * | 5/2001 | Okuda et al. | 463/27 |
| 6,402,150 | B1 * | 6/2002 | Jones | 273/292 |

OTHER PUBLICATIONS

Slot machine called "*Money Money*," by Sigma Game, Inc., 1996.

(Continued)

*Primary Examiner*—Robert E Pezzuto
*Assistant Examiner*—Alex F. R. P. Rada, II
(74) *Attorney, Agent, or Firm*—The Culbertson Group, P.C.

(57) ABSTRACT

A progressive jackpot slot machine, or group of slot machines, is described herein. A plurality of progressive jackpots are accumulated as the slot machine is played. In the preferred embodiment, a first progressive jackpot is accumulated at a first rate, and a second progressive jackpot is accumulated at a rate higher than the first rate. Additional jackpots accumulate at higher rates. The betting of additional monetary amounts enables the player to win additional jackpots. This provides added incentive for the player to bet additional monetary amounts.

37 Claims, 7 Drawing Sheets

OTHER PUBLICATIONS

Marshall Fey, "*Slot Machines, A Pictorial History Of The First 100 Years*," Fifth Edition, 1997, p. 208, showing the Bally model '889 slot machine.

Marshall Fey, "*Slot Machines, A Pictorial History Of The First 100 Years*," Fifth Edition, 1997, p. 212, showing the "MegaBucks" slot machine by IGT.

Indian Gaming, "I*GT On A Progressive Game Roll*," p. 37, Dec. 1998, showing the "QuarterMania" slot machine by IGT.

Slot Manager, "*Making Poker Pay*," p. 14, Jan. 1999, showing "PokerMania" slot machine by IGT.

Slot Manager, "*New Slot Strategies Pay Off*," p. 10, Apr. 1998.

Slot Manager, "*Space Considerations*," p. 32, Jul. 1997.

Casino Journal, "*Slot Wars, Will Interactive Technology Change The Face Of Gaming*?" p. 42, Jun. 1996.

Casino Executive, "*The Ultimate Slot Floor*," p. 33, Jan. 1999.

Casino Executive, "*Poker Plus*," p. 61, Jun. 1998.

Casino Player, "*Loosest Slots Awards 1999*," p. 52, Apr. 1999.

* cited by examiner

SLOT MACHINE HAVING MULTIPLE PROGRESSIVE JACKPOTS

FIELD OF THE INVENTION

This invention relates to gaming machines, such as slot machines, and in particular to a progressive jackpot feature on such gaming machines.

BACKGROUND OF THE INVENTION

Slot machines having progressive jackpots are well known. Examples of such machines are found in U.S. Pat. Nos. 5,048,833; 5,249,800, and 5,280,909, incorporated herein by reference. In existing devices, a small percentage of each amount bet in either one machine or a group of machines is allocated to a progressive jackpot. A special symbol combination is designated as the progressive jackpot winner. When this jackpot symbol combination is obtained by a slot machine, the progressive jackpot is awarded to that player, and the jackpot is reset to an initial amount. The initial amount may be zero or any other predetermined amount. In such machines, there is typically only one progressive jackpot.

Slot machines which generate higher revenues for the machine owner are more valuable to the machine owner. Thus, any feature that makes a slot machine more enticing to a player and causes the player to deposit more money into the machine is desirable.

SUMMARY

A progressive jackpot slot machine, or a group of slot machines, is described herein, where multiple progressive jackpots may be won. In one embodiment, a single coin bet on a game entitles the player to win a first progressive jackpot if a special symbol combination is obtained by the machine. If the player chooses to deposit two coins for a single game, the player can then win a second progressive jackpot. This second progressive jackpot may be in addition to the first progressive jackpot. If the player deposits three coins for a single game, the player has an opportunity to win a third progressive jackpot, or the total amount of the first, second, and third progressive jackpots. The invention envisions any number of progressive jackpots and any required monetary amounts to qualify for the various jackpots.

In one embodiment, the first progressive jackpot is built upon allocating 0.5% of all bets wagered in the various machines in the group. The second progressive jackpot allocates 1% of all the bets wagered, and the third progressive jackpot allocates 2% of all the bets wagered. This concept may be applied to other percentages such that the second progressive jackpot is larger than the first progressive jackpot, and the third progressive jackpot is larger than the second progressive jackpot. In this manner, the player has a further incentive to play the maximum number of coins to win the largest jackpot.

This concept may be applied to single slot machines or slot machines within a group. This concept may also be applied to single payline slot machines, 3-payline slot machines, or other types of slot machines, such as 9-payline slot machines.

DETAILED DESCRIPTION OF THE EMBODIMENTS

Figure 1:
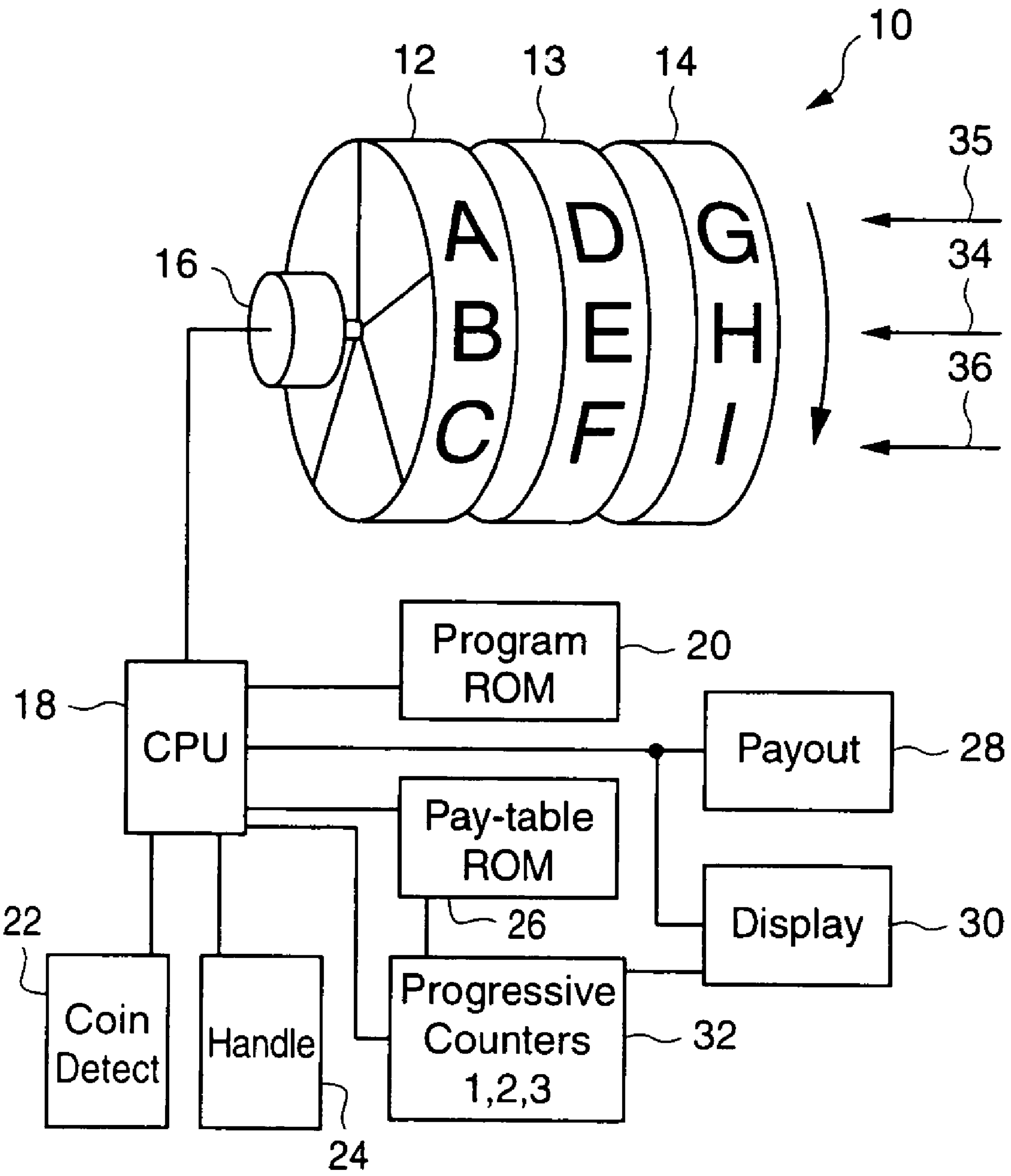
FIG. 1 illustrates the functional components of a mechanical reel-type slot machine incorporating the multiple progressive jackpot feature.

FIG. 1 illustrates the primary functional units in a slot machine in accordance with one embodiment of the invention. In slot machine 10, each of the reels 12, 13, and 14 has a variety of symbols printed on its periphery. Each of the reels 12-14 is driven by a separate stepper motor 16 which rotates in response to pulses from a CPU 18. When the pulses to a stepper motor 16 are terminated, the reel stops abruptly.

In one embodiment, the stopping positions of the reels 12-14 are predetermined using a random number generator consisting of a random number generator program in the program ROM 20 carried out by the CPU 18. The required number of pulses to the three stepper motors after a zero position of each reel are then generated to display the predetermined symbol combination. In another embodiment, each of the reels has tabs that are sensed by a photodetector to determine the angular displacement of the reel and thus the final displayed symbol. Other means for detecting the positions of the reels exist and are well known.

A money detector 22, which may detect coins or other currency, issues a command to the CPU 18 that the slot machine 10 is ready to be played. The player may then pull a handle 24 or press a button to initiate play.

After the reels have stopped, the CPU 18 conveys the stop positions to a pay-table ROM 26, which cross-references the final displayed symbols with a monetary payout to the player. This payout is then conveyed to a payout mechanism 28 which issues coins or credits to the player. A display 30 may also be activated, signaling a win to the player.

The above general description of a modern slot machine would be well known in the art, and such a programmable machine offers great advantages. Slot machines are varied by simply changing the operating program in the program ROM 20 and the award program in the pay-table ROM 26. The front glass of the slot machine is also changeable to convey particular features of the machine.

Examples of such conventional portions of slot machines are found in U.S. Pat. Nos. 4,095,795 to Saxton et al.; 4,448,419 to Telnaes; and 4,573,681 to Okada, all incorporated herein by reference.

In addition to conventional portions of a slot machine, the slot machine in accordance with the present invention includes circuitry, or a program, that generates multiple progressive jackpots that may be won by the player. In one embodiment, there are three different progressive jackpots, each jackpot being accumulated at a different rate. This jackpot circuitry is designated as circuitry 32 in FIG. 1. Each of the jackpots is displayed on display 30, which may be a display in the slot machine itself or a public display viewable by anyone playing a slot machine connected in a group such that any slot machine in the group which achieves the particular jackpot combination receives the designated jackpot displayed.

In one embodiment, each of the jackpots is based upon allocating a percentage of each amount bet by the players of the group of slot machines or, in the case of an individual slot machine incorporating the invented feature, a percentage of the money deposited into that individual slot machine. Such an accumulation of the progressive jackpots may be by counting the monetary units deposited into the slot machines and performing simple mathematical calculations to obtain the amounts to be added to the various jackpots. In one embodiment, modulo X counters count the monetary units bet, and the respective jackpot is only incremented upon each zero detection of the counter.

Figure 2:
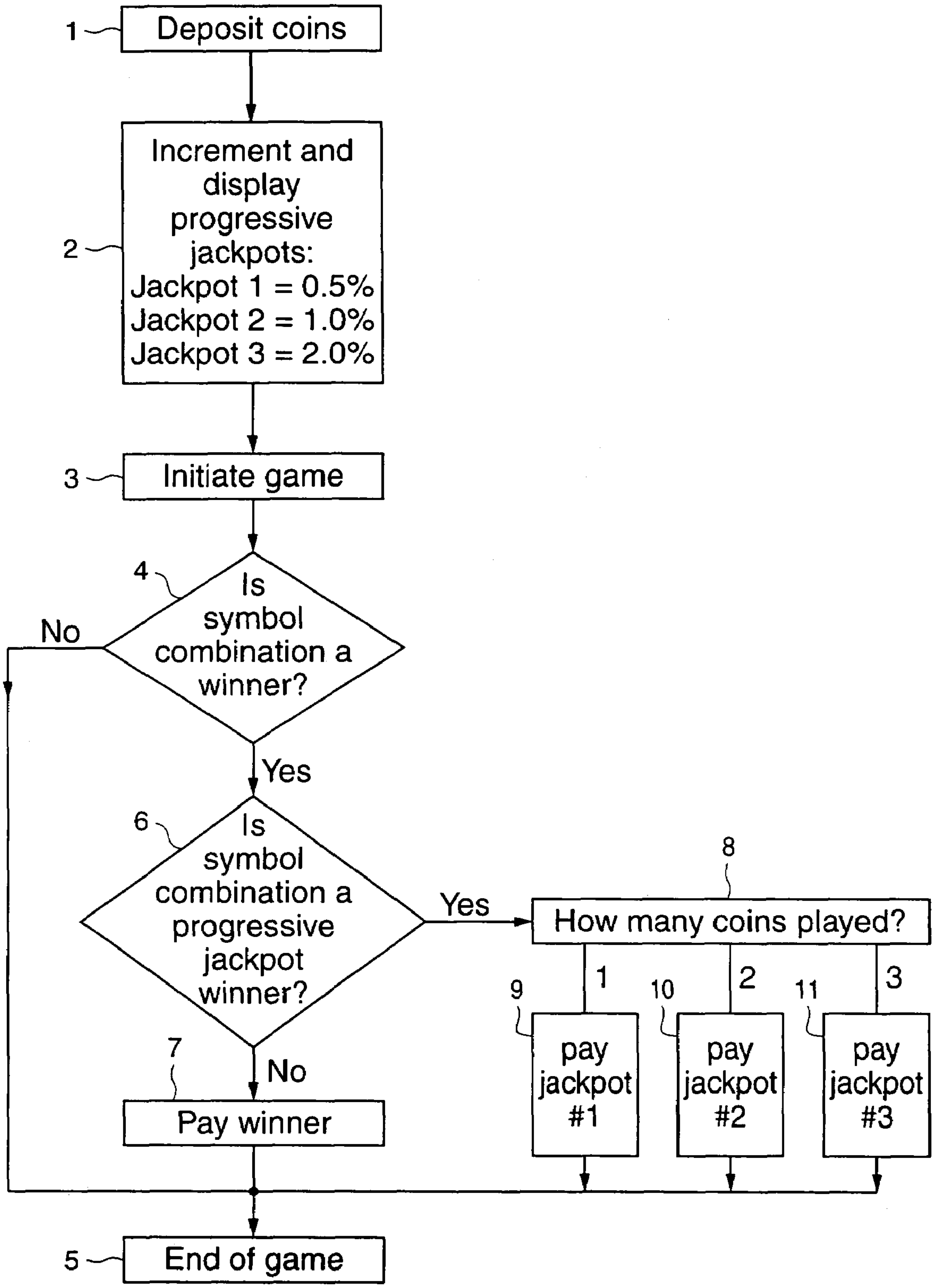
FIG. 2 is a flowchart illustrating the basic steps performed by the slot machine of FIG. 1.

FIG. 2 is a flowchart illustrating one possible method performed by the slot machine of FIG. 1. In step 1, coins or other monetary units are deposited. Any type of monetary credit may also be used. In the simplest embodiment, one coin enables the player to win the first progressive jackpot if a special combination of symbols is displayed by the slot machine 10. In conventional slot machines, depositing another coin simply doubles the winnings for any winning combination of symbols, not including the progressive jackpot. For example, two cherries displayed after betting a single coin may pay off three coins, and two cherries displayed with a two coin bet pays off six coins. In order to provide further incentive for the player to deposit two coins, a second jackpot is offered which is typically higher than the first jackpot. In one embodiment, with a two coin bet, if the player obtains the special symbol combination that pays the jackpot, the player will win the second jackpot plus the first jackpot. In another embodiment, the player will only win the second jackpot. As in conventional machines, the winning of a jackpot resets the jackpot amount to either zero or an initial predetermined amount.

This concept may be extended to additional jackpots corresponding to additional coins being played. Further, additional special symbol combinations may be designated that win the second jackpot but not the first jackpot, providing further incentive to bet additional coins.

Referring back to FIG. 2, after the player deposits the desired monetary amount, which will determine the possible jackpots that may be won upon achieving the special combination, the various jackpots are incremented according to the particular algorithm used. In the embodiment of FIG. 2, the progressive jackpot 1 is incremented by 0.5% of the amount bet, the jackpot 2 is incremented by 1% of the amount bet, and the jackpot 3 is incremented by 2% of the amount bet. Thus, jackpot 2 will typically be twice as large as jackpot 1, but jackpot 3 will be four times as large as jackpot 1, providing an added incentive to play three coins.

The jackpots are displayed to all the players, thus providing added incentive to play the machines over other machines which do not provide a jackpot or only provide a single jackpot.

In step 3, the player initiates the game by either pressing a button or pulling a handle. The reels rotate and stop at a predetermined combination, determined by a random number generator, as previously described.

In step 4, it is determined whether the symbol combination is a winner. If the symbol combination is not a winner, the game is over (step 5).

If the symbol combination is deemed a winner, the method proceeds to step 6, which determines whether the symbol combination is a progressive jackpot winner. If not, the method proceeds to step 7, whereby the player's winnings are determined by the pay-table ROM 26 (FIG. 1), and CPU 18 controls the payout mechanism 28 to pay the appropriate number of coins to the player or credit the player's account.

If the result of step 6 is that the symbol combination is a progressive jackpot winner, it is determined in step 8 how many coins (or credits) were bet by the player in order to determine which jackpot(s) to pay the player.

In one embodiment, a 3-coin play will pay the highest progressive jackpot. In another embodiment, a 3-coin play will only pay jackpot 3. In another embodiment, a 3-coin play will pay the total of all three jackpots. Similarly, in one embodiment, a 2-coin play will pay the higher of jackpot 1 or jackpot 2. In another embodiment, a 2-coin play will only pay jackpot 2. In an alternate embodiment, a 2-coin play will pay the sum of jackpots 1 and 2.

The control signals to pay the various jackpots are applied to the payout mechanism 28 (steps 9, 10, and 11) or, alternatively, an alarm is sounded and an attendant pays the jackpot (s) to the player.

Figure 3:
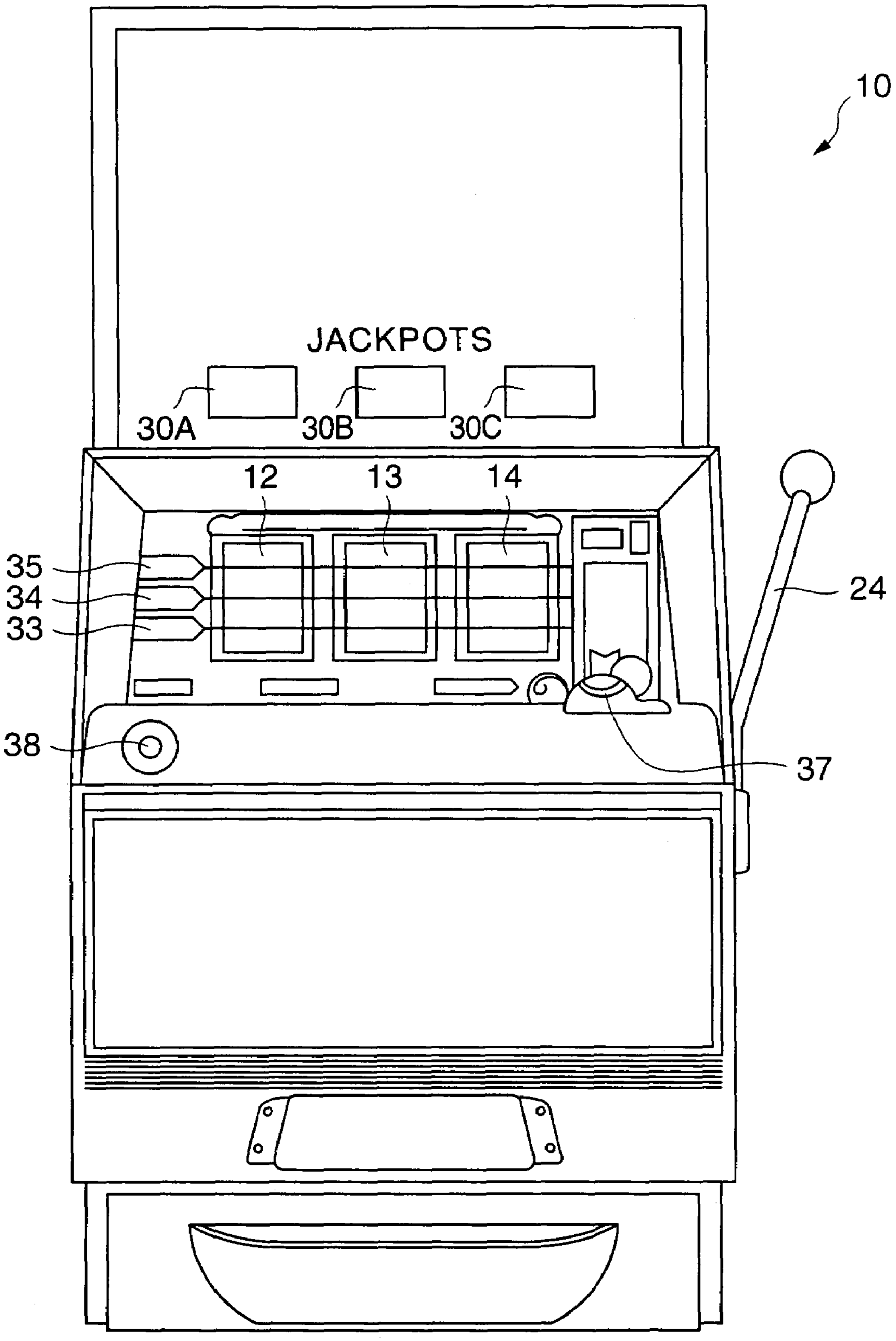
FIG. 3 illustrates one embodiment of a slot machine incorporating the invention and having a display for three different jackpots.

In one embodiment, the slot machine is a single payline machine, where only symbols across payline 34 (FIGS. 1 and 3) are used for determining a winning combination. In another type of machine, there are three paylines 34, 35, and 36 (FIGS. 1 and 3). In such a device, each coin activates a corresponding payline so that a 3-coin play will activate all three paylines 34-36 as well as activate all the jackpots. In another embodiment, a three coin play activates the three paylines 34-36 and jackpot 1. An additional three coins doubles the awards as well as enables the winning of jackpot 2. An additional three coins triples the base awards and enables the winning of jackpot 3.

In one embodiment of the game, jackpot 1 is only achievable with the special combination of symbols along the payline 34, jackpot 2 is only achievable across the payline 35, and jackpot 3 is only achievable across the payline 36. In other embodiments, a jackpot combination of symbols across any of the paylines 34-36 (assuming 3 coins have been bet) pays the player jackpot 3, whether by itself or in addition to jackpots 1 and 2, depending upon the particular embodiment.

FIG. 3 is a front view of a 3-payline slot machine 10 incorporating the functional units of FIG. 1. Jackpot displays 30A, 30B, and 30C display the three jackpots, respectively. A coin slot 37 and game play button 38 are also shown.

Figure 4:
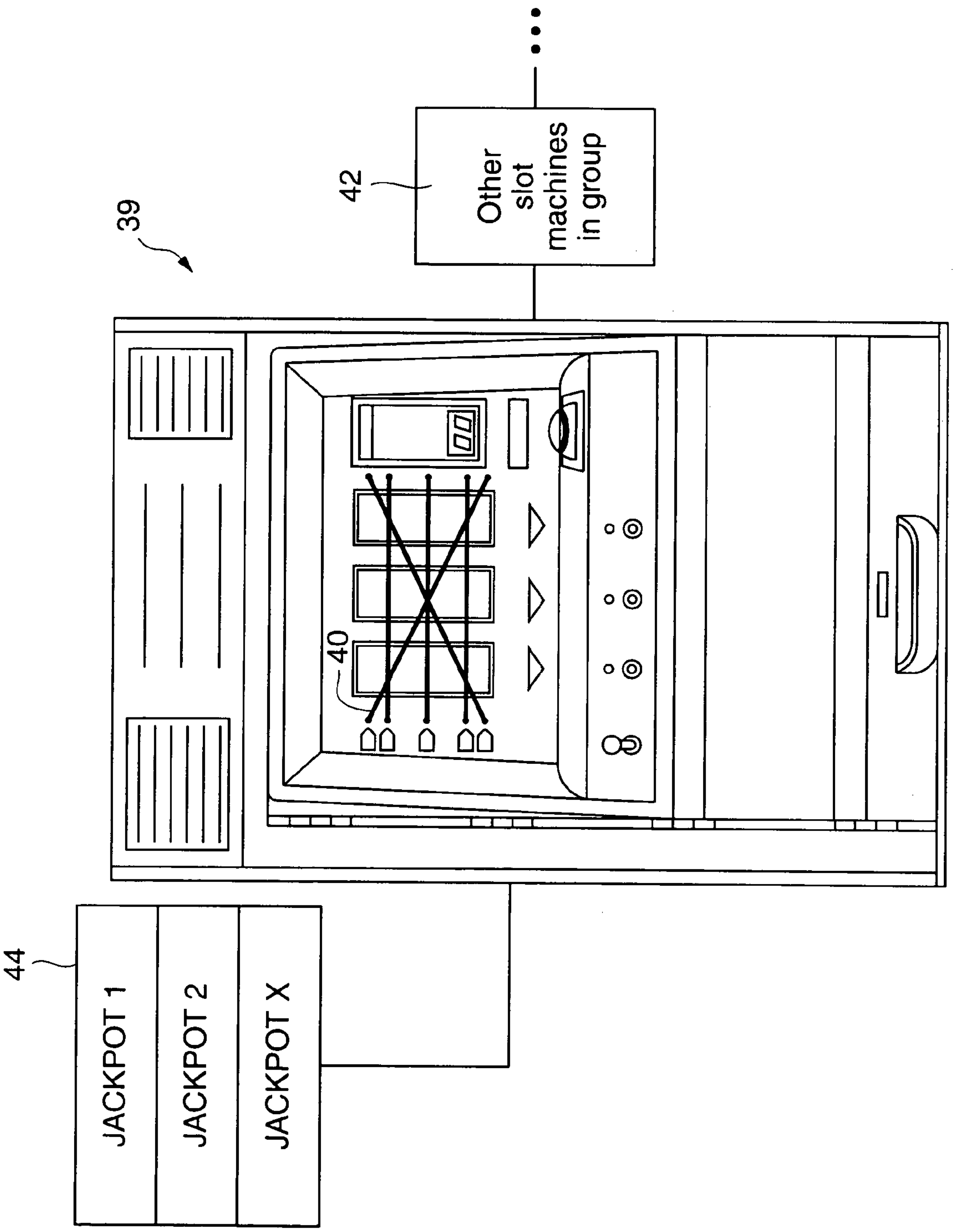
FIG. 4 is a front view of a slot machine having five paylines and an external display for displaying the different progressive jackpots.

The technique described with respect to FIGS. 1-3 may apply to either a single slot machine or a group of linked slot machines. FIG. 4 illustrates a slot machine 39 connected in a group of linked gaming machines, each machine having five possible ways of winning across horizontal and diagonal paylines 40.

FIG. 4 illustrates other slot machines 42 connected to slot machine 39. In such a group of linked gaming machines, it is often desirable to have a large display 44 external to the slot machines so that all players in the group may see the jackpots. A central processor polls all the machines in the group and calculates the jackpots.

Using a 5-payline machine, in one embodiment, the player inserts five coins to obtain the benefits of all 5 paylines and a chance at the first jackpot. The player must insert an additional five coins in order to double all award amounts and to be eligible for a second jackpot. The machine may require the player to insert a total of 15 coins to triple all award amounts and have the capability to win the third jackpot. Of course this concept may be extended to any number of jackpots.

Figure 5:
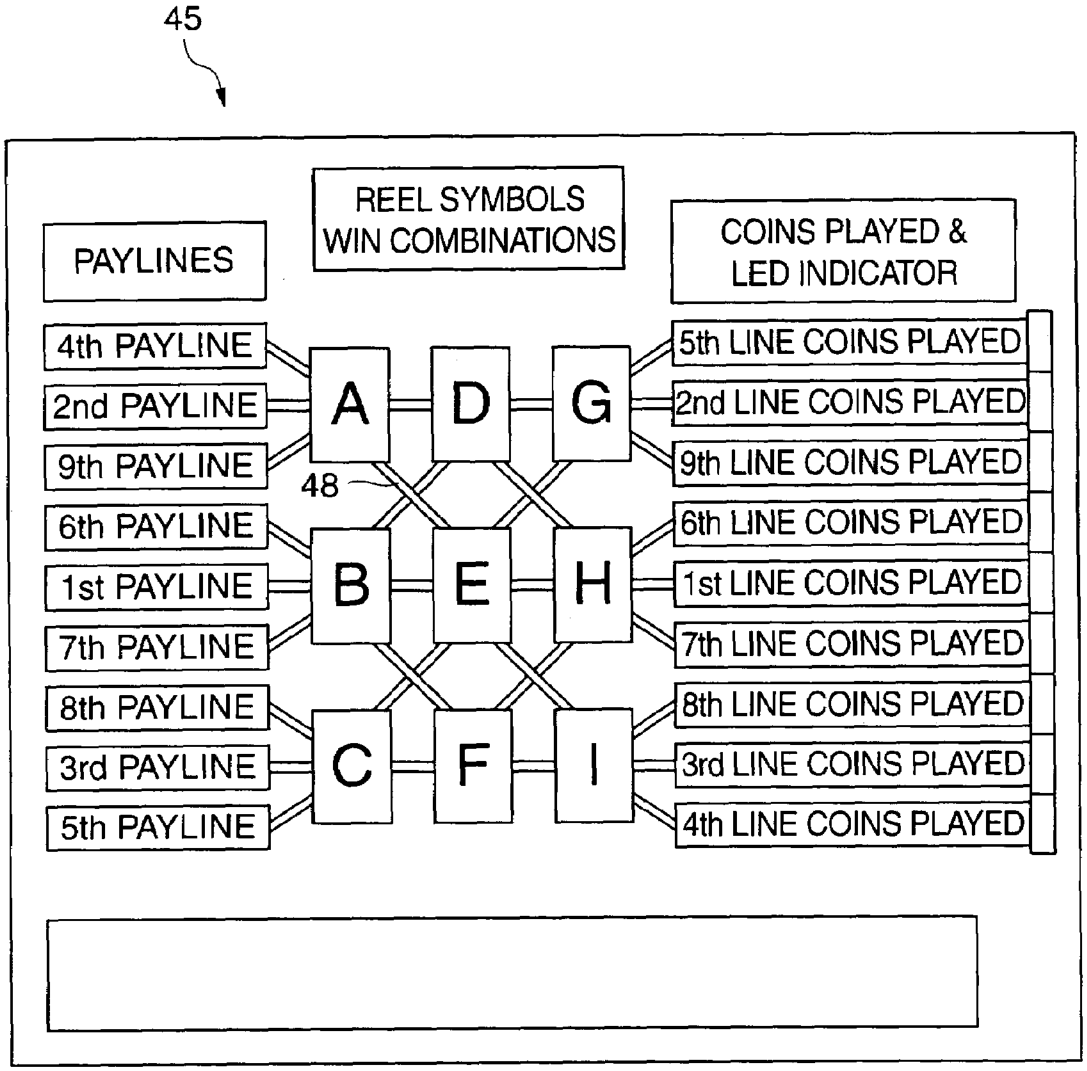
FIG. 5 illustrates the paylines for a 9-payline machine.

This concept may be applied to a 9-payline slot machine (FIG. 5), having a display 45. Such a machine is described in U.S. Pat. No. 5,807,172, incorporated herein by reference. With a 9-payline machine, each additional set of nine coins allows the player to win another progressive jackpot as well as multiply the standard awards. In FIG. 5, the activated paylines 48 are illuminated.

Figure 6:
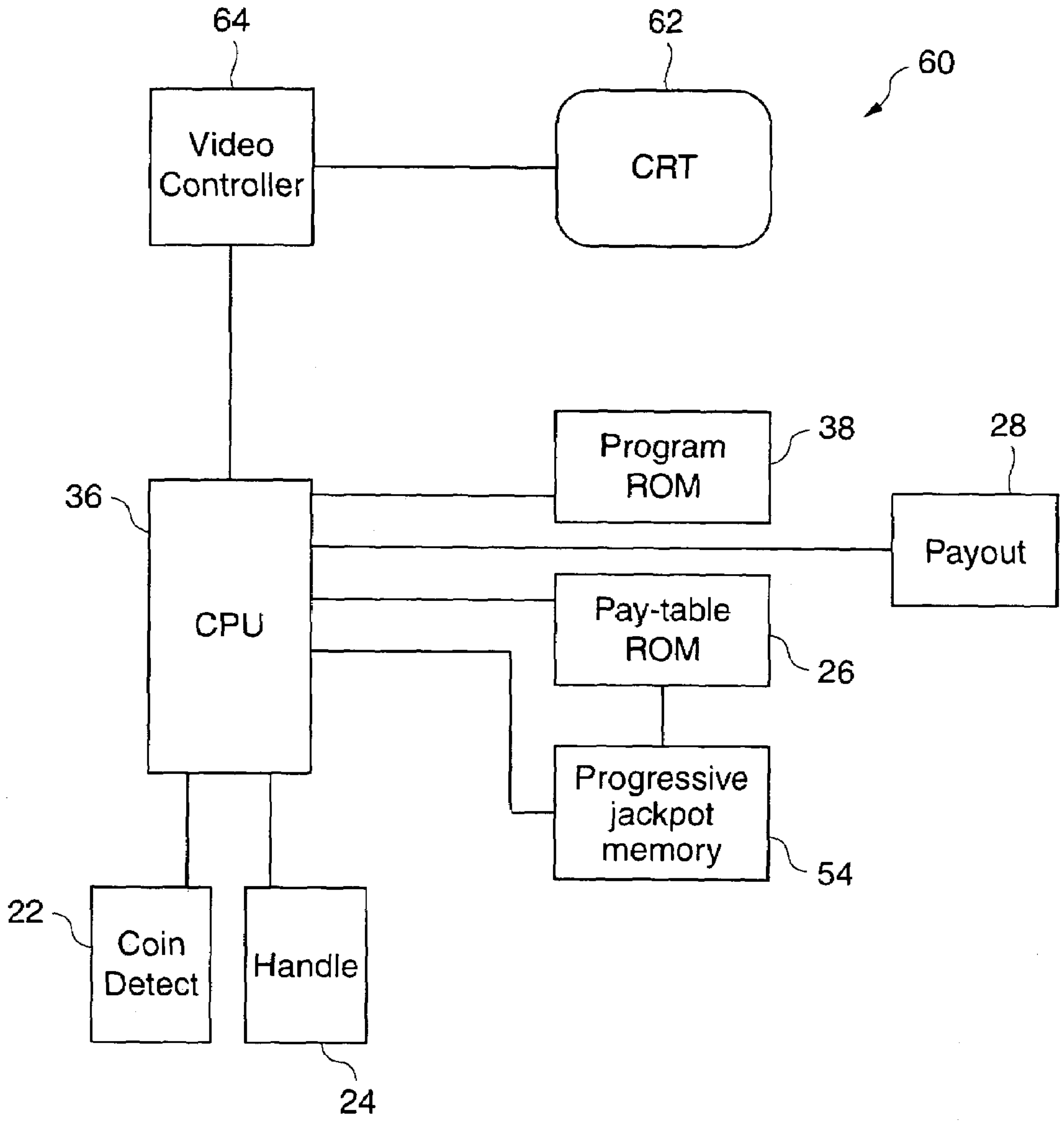
FIG. 6 illustrates the functional components of a video slot machine incorporating the present invention.

The above-described concept of multiple jackpots can also be applied to a video slot machine, which is essentially the same as that described with FIG. 1 except for the display portion. FIG. 6 illustrates the circuitry used in a video slot machine 60 which displays an animated version of rotating reels on a CRT 62. Other types of displays may also be used. A video controller 64 controls CRT 62 and receives commands from CPU 36. One skilled in the art would understand the requirements for video controller 64 and CPU 36, since these devices would be generic to a wide variety of slot machines. Functional units in FIGS. 1 and 6 labeled with the same numerals may be identical. The video controller 64 receives simple codes from CPU 36, then converts these codes into the pixel control signals used by CRT 62 to illustrate the rotating reels.

A progressive jackpot memory 54, which may use counters or simply store values calculated by CPU 36, identifies the jackpot amounts for the plurality of jackpots. The flowchart for this video slot machine is identical to that of FIG. 2. Video machines may be linked together as described with respect to FIG. 4.

Figure 7:
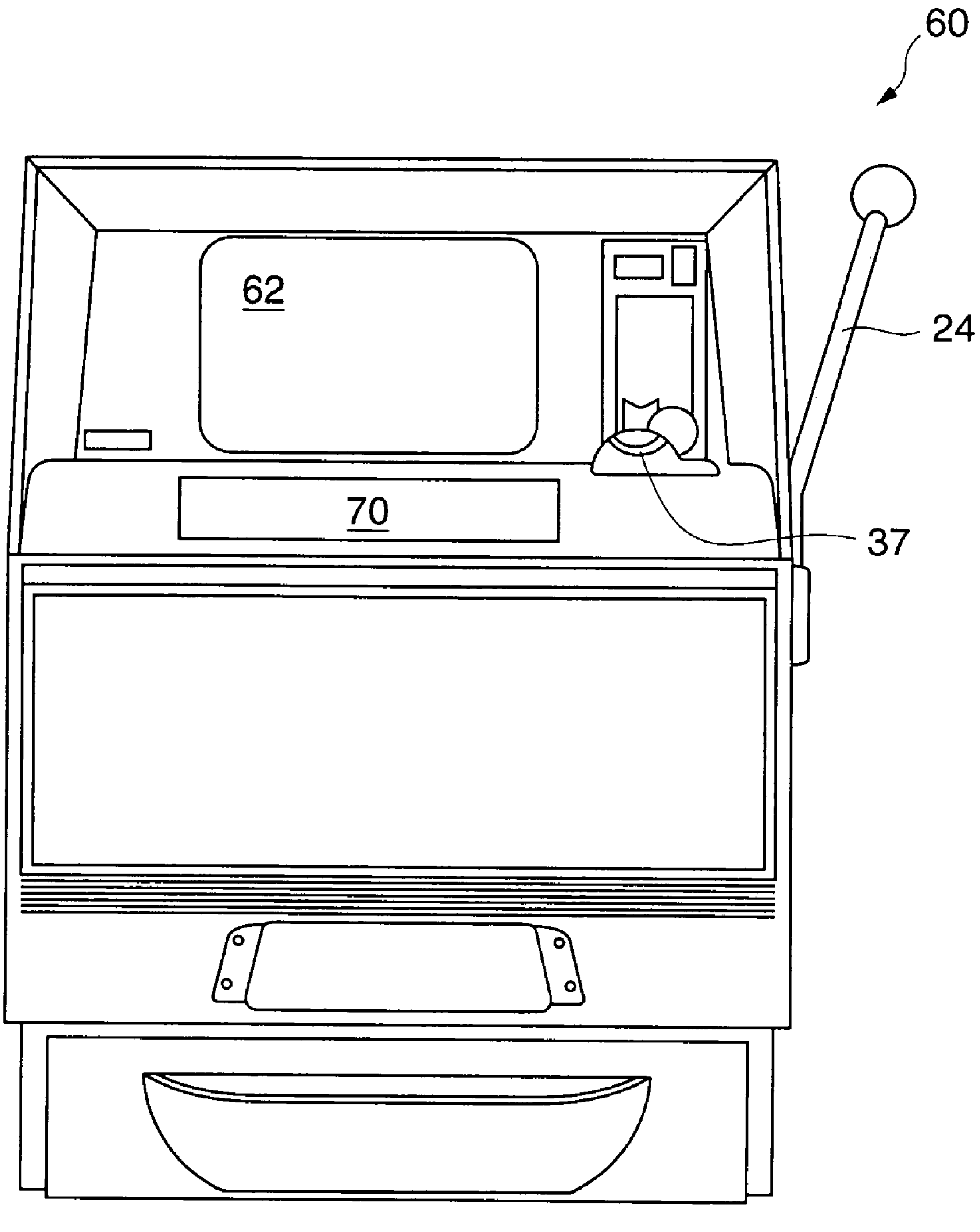
FIG. 7 is a front view of a video slot machine incorporating the present invention.

FIG. 7 is a front view of the video slot machine 60 that houses the functional units of FIG. 6. A control panel 70 provides a player interface for entering such information as the bet amount. A touch screen may also be used as a player input device.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming method for a gaming system comprising one or more gaming machines, the gaming method comprising the steps of:

providing a first progressive jackpot and a second progressive jackpot for the one or more gaming machines, the first progressive jackpot being funded by a first percentage of each wager placed through the one or more gaming machines and the second progressive jackpot being funded by a second percentage of each wager placed through the one or more gaming machines;

receiving a respective wager through one of the one or more gaming machines in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the second progressive jackpot if the gaming result is the winning progressive jackpot result and if the respective wager is at least a second wager amount, the second wager amount being larger than the first wager amount;

making a monetary payout if the gaming result is a winning result which is not the winning progressive jackpot result;

increasing the first progressive jackpot in response to receiving the respective wager; and increasing the second progressive jackpot in response to receiving the respective wager, wherein the increase in the second progressive jackpot is larger than the increase in the first progressive jackpot.

2. A gaming method for a gaming system comprising one or more gaming machines, the gaming method comprising:

providing a first progressive jackpot and a second progressive jackpot for the one or more gaming machines, the first progressive jackpot being funded by a first percentage of each wager placed through the one or more gaming machines and the second progressive jackpot being funded by a second percentage of each wager placed through the one or more gaming machines;

receiving a respective wager through one of the one or more gaming machines in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the first progressive jackpot and the second progressive jackpot if the gaming result is the winning progressive jackpot result and if the respective wager is at least a second wager amount, the second wager amount being larger than the first wager amount; and making a monetary payout if the gaming result is a winning result which is not the winning progressive jackpot result.

3. A gaming method comprising the steps of:

providing a first progressive jackpot and a second progressive jackpot for a gaming system;

receiving a wager in the gaming system;

displaying a number of rotating elements which come to rest showing a combination of symbols representing a gaming result;

paying the first progressive jackpot if the gaming result is a winning progressive jackpot result and if the wager is at least a first wager amount;

paying the second progressive jackpot if the gaming result is the winning progressive jackpot result and if the wager is at least a second wager amount, the second wager amount being larger than the first wager amount; and the gaming system comprises a single gaming machine.

4. A gaming method comprising the steps of:

providing a first progressive jackpot and a second progressive jackpot for a gaming system, the first progressive jackpot being funded by a first percentage of each wager placed through the gaming system and the second progressive jackpot being funded by a second percentage of each wager placed through the gaming system;

receiving a respective wager in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the second progressive jackpot if the gaming result is the winning progressive jackpot result and if the respective wager is at least a second wager amount, the second wager amount being larger than the first wager amount;

making a monetary payout if the gaming result is a winning result which is not the winning progressive jackpot result;

wherein the gaming system comprises a plurality of linked gaming machines;

wherein the first and the second progressive jackpots are common to all linked gaming machines; and wherein the first and the second progressive jackpots are increased in response to a wager received by any unique linked gaming machine.

5. A gaming method for a gaming system comprising one or more gaming machines, the gaming method comprising the steps of:

providing a first progressive jackpot and a second progressive jackpot for the one or more gaming machines, the first progressive jackpot being funded by a first percentage of each wager placed through the one or more gaming machines and the second progressive jackpot being funded by a second percentage of each wager placed through the one or more gaming machines;

receiving a respective wager in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the second progressive jackpot if the gaming result is the winning progressive jackpot result and if the respective wager is at least a second wager amount, the second wager amount being larger than the first wager amount;

making a monetary payout if the gaming result is a winning result which is not the winning progressive jackpot result; and wherein the respective wager activates a single payline through the combination of symbols.

6. A gaming method for a gaming system comprising one or more gaming machines, the gaming method comprising the steps of:

providing a first progressive jackpot and a second progressive jackpot for the one or more gaming machines, the first progressive jackpot being funded by a first percentage of each wager placed through the one or more gaming machines and the second progressive jackpot being funded by a second percentage of each wager placed through the one or more gaming machines;

receiving a respective wager in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the second progressive jackpot if the gaming result is the winning progressive jackpot result and if the respective wager is at least a second wager amount, the second wager amount being larger than the first wager amount;

making a monetary payout if the gaming result is a winning result which is not the winning progressive jackpot result; and wherein the wager activates a plurality of paylines through the combination of symbols.

7. A gaming method for a gaming system comprising one or more gaming machines, the gaming method comprising the steps of:

providing a first progressive jackpot and a second progressive jackpot for the one or more gaming machines, the first progressive jackpot being funded by a first percentage of each wager placed through the one or more gaming machines and the second progressive jackpot being funded by a second percentage of each wager placed through the one or more gaming machines;

receiving a respective wager in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the second progressive jackpot if the gaming result is the winning progressive jackpot result and if the respective wager is at least a second wager amount, the second wager amount being larger than the first wager amount;

making a monetary payout if the gaming result is a winning result which is not the winning progressive jackpot result; and wherein a number of paylines activated by the second wager amount is identical to a number of paylines activated by the first wager amount.

8. A gaming method for a gaming system comprising one or more gaming machines, the gaming method comprising the steps of:

providing a first progressive jackpot and a second progressive jackpot for the one or more gaming machines, the first progressive jackpot being funded by a first percentage of each wager placed through the one or more gaming machines and the second progressive jackpot being funded by a second percentage of each wager placed through the one or more gaming machines;

receiving a respective wager in the gaming system;

displaying a number of rotating elements which come to rest showing a combination of symbols representing a gaming result;

paying the first progressive jackpot if the gaming result is a winning progressive jackpot result and if the respective wager is at least a first wager amount;

paying the second progressive jackpot if the gaming result is the winning progressive jackpot result and if the respective wager is at least a second wager amount, the second wager amount being larger than the first wager amount;

making a monetary payout if the gaming result is a winning result which is not the winning progressive jackpot result; and wherein a number of paylines activated by the second wager amount is larger than a number of paylines activated by the first wager amount.

9. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system pays the second progressive jackpot if the gaming result is the winning progressive jackpot result and if the respective wager sensed by the detector is at least a second wager amount, the second wager amount being larger than the first wager amount;

wherein the gaming system makes a monetary payout if the gaming result is a winning result which is not the winning progressive jackpot result; and wherein in response to the detector receiving the respective wager, the gaming system increases the first progressive jackpot and increases the second progressive jackpot, the increase in the second progressive jackpot being larger than the increase in the first progressive jackpot.

10. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system makes a monetary payout if the gaming result is a winning result which is not the winning progressive jackpot result; and wherein the gaming system pays the first progressive jackpot and the second progressive jackpot if the gaming result is the winning progressive jackpot result and if the respective wager is at least a second wager amount, the second wager amount being larger than the first wager amount.

11. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system pays the second progressive jackpot if the gaming result is the winning progressive jackpot result and if the respective wager sensed by the detector is at least a second wager amount, the second wager amount being larger than the first wager amount;

wherein the gaming system makes a monetary payout if the gaming result is a winning result which is not the winning progressive jackpot result;

wherein the gaming machine resets the first progressive jackpot to a first predetermined reset amount after paying the first progressive jackpot, and resets the second progressive jackpot to a second predetermined reset amount after paying the second progressive jackpot; and wherein the first and the second predetermined reset amounts are larger than zero.

12. The system of claim 11, wherein the second predetermined reset amount is larger than the first predetermined reset amount.

13. A gaming system comprising:

a plurality of linked gaming machines, each linked gaming machine comprising a respective wager detector;

a first progressive jackpot associated with the plurality of linked gaming machines and a second progressive jackpot associated with the plurality of linked gaming machines, the first progressive jackpot being funded by a first percentage of each wager placed through the gaming system and the second progressive jackpot being funded by a second percentage of each wager placed through the gaming system;

wherein a respective one of the gaming machines displays a number of rotating elements which come to rest showing a combination of symbols representing a gaming result;

wherein the gaming system pays the first progressive jackpot if the gaming result is a winning progressive jackpot result and if a respective wager sensed by the detector of the respective one of the gaming machines is at least a first wager amount;

wherein the gaming system pays the second progressive jackpot if the gaming result is the winning progressive jackpot result and if the respective wager sensed by the detector of the respective one of the gaming machines is at least a second wager amount, the second wager amount being larger than the first wager amount;

wherein the first and the second progressive jackpots are common to all linked gaming machines; and wherein the first and the second progressive jackpots are increased in response to a respective wager received by any respective one of the linked gaming machines.

14. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system pays the second progressive jackpot if the gaming result is the winning progressive jackpot result and if the respective wager sensed by the detector is at least a second wager amount, the second wager amount being larger than the first wager amount;

wherein the gaming system makes a monetary payout if the gaming result is a winning result which is not the winning progressive jackpot result; and wherein the respective wager activates a single payline for the gaming machine.

15. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system pays the second progressive jackpot if the gaming result is the winning progressive jackpot result and if the respective wager sensed by the detector is at least a second wager amount, the second wager amount being larger than the first wager amount;

wherein the gaming system makes a monetary payout if the gaming result is a winning result which is not the winning progressive jackpot result; and wherein the respective wager activates a plurality of paylines for the gaming machine.

16. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system pays the second progressive jackpot if the gaming result is the winning progressive jackpot result and if the respective wager sensed by the detector is at least a second wager amount, the second wager amount being larger than the first wager amount;

wherein the gaming system makes a monetary payout if the gaming result is a winning result which is not the winning progressive jackpot result; and wherein a number of paylines activated by the second wager amount is identical to a number of paylines activated by the first wager amount.

17. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein the gaming system pays the first progressive jackpot if the gaming result is a winning progressive jackpot result and if a respective wager sensed by the detector is at least a first wager amount;

wherein the gaming system pays the second progressive jackpot if the gaming result is the winning progressive jackpot result and if the respective wager sensed by the detector is at least a second wager amount, the second wager amount being larger than the first wager amount;

wherein the gaming system makes a monetary payout if the gaming result is a winning result which is not the winning progressive jackpot result; and wherein a number of paylines activated by the second wager amount is larger than a number of paylines activated by the first wager amount.

18. A gaming system comprising:

a gaming machine comprising a wager detector;

a first progressive jackpot associated with the gaming machine and a second progressive jackpot associated with the gaming machine, the first progressive jackpot being funded by a first percentage of each wager placed through the gaming machine and the second progressive jackpot being funded by a second percentage of each wager placed through the gaming machine;

wherein the gaming machine displays a number of rotating elements which come to rest showing a combination of symbols representing a gaming result;

wherein if the gaming result is a winning progressive jackpot result, the gaming system pays the largest of either the first progressive jackpot or the second progressive jackpot; and wherein the gaming system makes a monetary payout if the gaming result is a winning result which is not the winning progressive jackpot result.

19. The system of claim 18, wherein in response to the detector receiving a wager, the gaming system increases the first progressive jackpot and increases the second progressive jackpot, wherein the increase in the second progressive jackpot is larger than the increase in the first progressive jackpot.

20. The system of claim 18:

wherein the gaming system resets the first progressive jackpot to a first predetermined reset amount after paying the first progressive jackpot, and resets the second progressive jackpot to a second predetermined reset amount after paying the second progressive jackpot; and wherein the first and the second predetermined reset amounts are larger than zero.

21. The system of claim 20, wherein the second predetermined reset amount is larger than the first predetermined reset amount.

22. The system of claim 18, wherein the gaming system comprises a single gaming machine.

23. The system of claim 18:

wherein the gaming system comprises a plurality of linked gaming machines;

wherein the first and the second progressive jackpots are common to all linked gaming machines; and wherein the first and the second progressive jackpots are increased in response to a wager received by any unique linked gaming machine.

24. The system of claim 18, wherein a wager sensed by the detector activates a single payline for the gaming machine.

25. The system of claim 18, wherein a wager sensed by the detector activates a plurality of paylines for the gaming machine.

26. The system of claim 18, wherein a number of paylines activated by a second wager amount is identical to a number of paylines activated by a first wager amount, the second wager amount being larger than the first wager amount.

27. The system of claim 18, wherein a number of paylines activated by a second wager amount is larger than a number of paylines activated by a first wager amount, the second wager amount being larger than the first wager amount.

28. A gaming method for a gaming system comprising one or more gaming machines, the method comprising the steps of:

providing a first progressive jackpot and a second progressive jackpot for, the one or more gaming machines, the first progressive jackpot being funded by a first percentage of each wager placed through the one or more gaming machines and the second progressive jackpot being funded by a second percentage of each wager placed through the one or more gaming machines;

receiving a respective wager in the gaming system;

displaying a number of rotating elements which come to rest showing a combination of symbols representing a gaming result;

if the gaming result is a winning progressive jackpot result, paying the largest of either the first progressive jackpot or the second progressive jackpot; and making a monetary payout if the gaming result is a winning result which is not the winning progressive jackpot result.

29. The gaming method of claim 28 further comprising the steps of:

increasing the first progressive jackpot in response to receiving the respective wager; and increasing the second progressive jackpot in response to receiving the respective wager, wherein the increase in the second progressive jackpot is larger than the increase in the first progressive jackpot.

30. The gaming method of claim 28, further comprising resetting the first progressive jackpot to a first predetermined reset amount after paying the first progressive jackpot, and resetting the second progressive jackpot to a second predetermined reset amount after paying the second progressive jackpot; wherein the first and the second predetermined reset amounts are larger than zero.

31. The method of claim 30, wherein the second predetermined reset amount is larger than the first predetermined reset amount.

32. The gaming method of claim 28, wherein the gaming system comprises a single gaming machine.

33. The gaming method of claim 28 wherein the gaming system comprises a plurality of linked gaming machines;

wherein the first and the second progressive jackpots are common to all linked gaming machines; and wherein the first and the second progressive jackpots are increased in response to a wager received by any unique linked gaming machine.

34. The gaming method of claim 28, wherein the respective wager activates a single payline for a gaming machine.

35. The gaming method of claim 28, wherein the respective wager activates a plurality of paylines for the gaming machine.

36. The gaming method of claim 28, wherein a number of paylines activated by a second wager amount is identical to a number of paylines activated by a first wager amount, the second wager amount being larger than the first wager amount.

37. The gaming method of claim 28, wherein a number of paylines activated by a second wager amount is larger than a number of paylines activated by a first wager amount, the second wager amount being larger than the first wager amount.

* * * * *